(12) United States Patent
Swan et al.

(10) Patent No.: US 6,497,249 B1
(45) Date of Patent: Dec. 24, 2002

(54) TELESCOPIC HOSE AND RELATED DRIVE SYSTEMS

(76) Inventors: Peter Ignatius Swan, P.O. Box 777, Muldersdrift 1747 (ZA); Richard Pierpont Moore, P.O. Box 471, Germiston 1400 (ZA)

( * ) Notice: Subject to any disclaimer, the term of this patent is extended or adjusted under 35 U.S.C. 154(b) by 0 days.

(21) Appl. No.: 09/221,000

(22) Filed: Dec. 28, 1998

(51) Int. Cl.[7] ............................................. E03B 65/20
(52) U.S. Cl. .................... 137/616.7; 137/615; 210/525; 210/527; 415/125; 91/350
(58) Field of Search ................................. 210/525, 527; 137/615, 616, 616.7; 415/125; 91/350

(56) References Cited

U.S. PATENT DOCUMENTS

| | | | | |
|---|---|---|---|---|
| 1,700,791 A | * | 2/1929 | Elrod | 210/527 |
| 2,460,004 A | * | 1/1949 | Green et al. | 91/350 |
| 3,333,704 A | * | 8/1967 | McGivern et al. | 210/242 |
| 3,494,476 A | * | 2/1970 | Passavant et al. | 210/527 |
| 4,379,049 A | * | 4/1983 | Bassett | 210/525 |
| 4,381,237 A | * | 4/1983 | Svensson | 210/525 |
| 4,670,142 A | * | 6/1987 | Lowry | 210/207 |
| 5,106,494 A | * | 4/1992 | Norcross | 210/123 |
| 5,358,644 A | * | 10/1994 | Dennis | 210/744 |
| 5,366,638 A | * | 11/1994 | Moore | 210/802 |

* cited by examiner

*Primary Examiner*—A. Michael Chambers

(57) ABSTRACT

This invention primarily relates to means to convey fluid from a moving location to a fixed location formerly achieved by the utilization of such means as a flexible hose. The invention has particular relevance to desludge systems where settled sludge take up means is caused to traverse the floor of a settling tank or vessel and transmit the sludge via a hose to a disposal point. The invention provides improved means replacing flexible hoses and further can provide means to motivate the traveling sludge take up means.

11 Claims, 3 Drawing Sheets

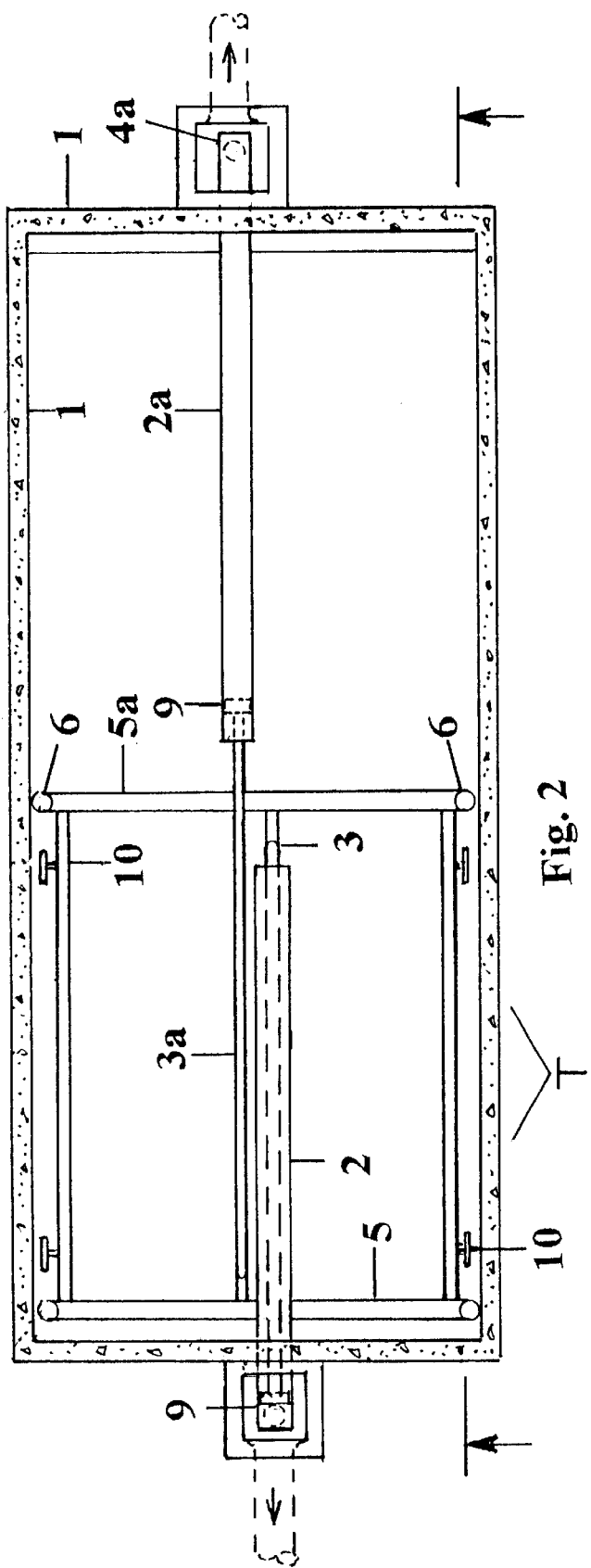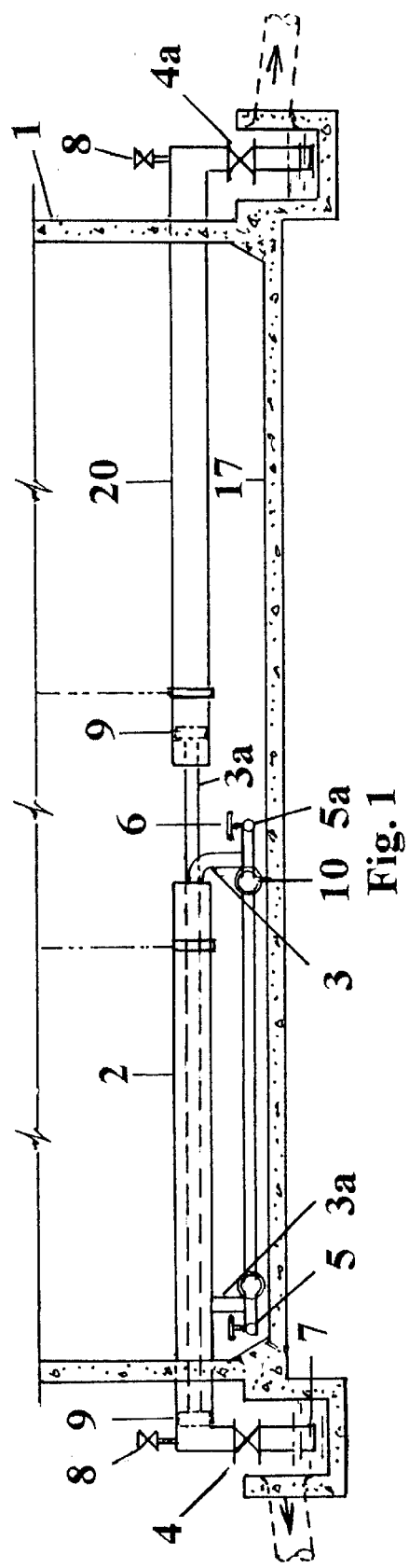

TELESCOPIC HOSE AND RELATED DRIVE SYSTEMS

Figure 4:
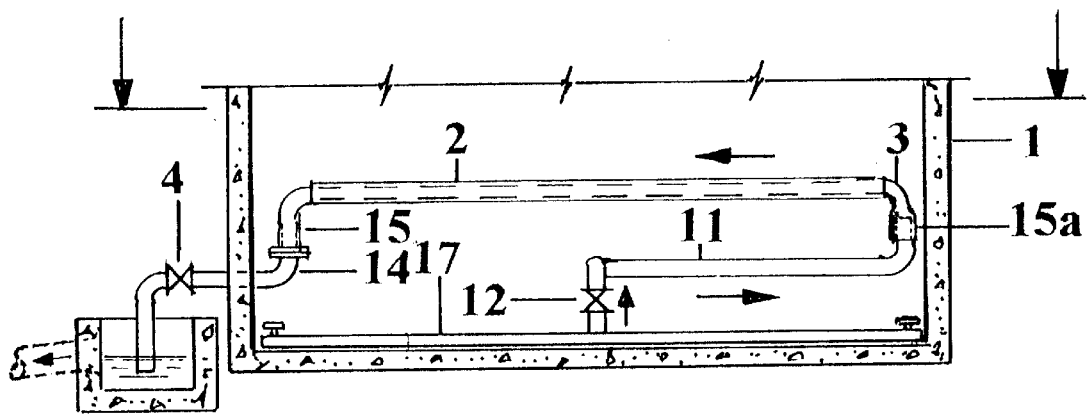

This invention that is described in South African provisional patent specification No. 9710946, dated of Dec. 5, 1997, primarily relates to means to convey fluid from a moving location to a fixed location formerly achieved by the utilisation of such means as a flexible hose.

Flexible hoses have limitations in that they are substantially inelastic and have to be provided in sufficient length to accommodate the maximum distance between a moving and fixed location entailing the expense and inconvenience of supporting the hose under maximum distance and the difficulty of accommodating the same hose when the distance is reduced to a minimum.

An object of the invention is to overcome the shortcomings of flexible hose under these conditions The invention has particular relevance to desludge systems where settled sludge suction takeup means is caused to traverse the floor of a settling tank or vessel and transmit the sludge via a hose to a disposal point and is particularly applicable to the desludge system described in U.S. Pat. No. 5,366,638, U.K. patent No 2 288 747 and S. African patent No. 92/5890. (R. P. Moore).

The invention provides improved means replacing flexible hoses and further can provide means to motivate the travelling sludge take up means.

In a further aspect of the invention the said conveyed fluid is utilised to drive or motivate a reciprocating sludge takeup system in one instance directly adapting the said means and in another instance utilising the said means.

According to the invention, a process for conveying fluid comprises a telescopic conduit, in which one or more hollow or conduit tubes, with in between sealing means, slide within each other, and provide means for conveying fluid from a movable point to a fixed point.

Further according to the invention, in any tank that accumulates sludge on the floor this telescopic conduit system comprises the means to convey the sludge from a movable sludge uptake system to any fixed point in the tank from where the sludge may exit the tank and be disposed of as required.

In a first example of the motivation or drive aspect of the invention, the difference in diameter between an outer and an inner conduit of the telescopic system is increased to provide, on the said sealing means, an area subject to differential pressure or suction from the conveyed fluid and the resulting force thereon is utilised to motivate or drive the sludge uptake system.

In a second example of the motivation or drive aspect of the invention, the flow of conveyed desludging liquid drives a rotary vane hydraulic motor that in turn motivates the trolley of a reciprocating travelling sludge uptake system via reduction drive means.

In a further description of the basic invention a means to convey fluid between a movable and a fixed location, comprises a lengthwise expandable and contractible telescopic conduit including an outer tubular conduit member connected at one end to a fixed fluid transfer receiving location and threaded from its opposite end by an inner tubular conduit member in turn connected at its opposite end to a movable fluid delivery source or vice versa with slidable sealing means between the inner and the outer tubular conduit members and between which intermediate telescopic conduit members may be provided, the whole comprising means to transfer fluid from a movable to a fixed location or vice versa.

The interconnecting telescopic conduit of the invention may have two basic forms, a "length-wise" or "end-on" form where the fixed point lies in the direction of travel of the moving point and the conduit expands and contracts in the direction of travel of the moving point and in what may be described as a "sideways" form where the fixed point is located at the side of the line of travel of the movable point and swivels to follow the path of the movable point, the telescopic conduit being provided with swivelling means at both the fixed and moving points and having its direction changing in accordance with the movement of the movable point. In both instances the telescopic conduit serves to replace flexible hose used to convey sludge in a desludging system such as that disclosed in South African patent No. 92/5890. (U.S. patent No. 5,366,638. U.K. patent No. GB 2 288 747 R. P. Moore).

Returning to the first claimed drive aspect of the invention, this drive aspect requires that the said seal (subject to the differential pressure when desludging) is located at and attached to the inner end of the sliding conduit further the invention would require two of the said differential (differential diameter) telescopic drive conduits, located, (offset from each other) at opposite ends of the line of drive (the said "end-on" arrangement of the telescopic conduits) in order to motivate in both directions in accordance with automatic transfer of the sludge flow to each conduit at the end of travel in each direction.

The automatic transfer of flow at the end of travel may be effected by the automatic change-over triggering of valves located (exterior to the tank from which sludge is being removed) at the discharge end of each conduit.

Each telescopic conduit would connect to individual sludge takeup means (such as a perforated pipe traversing the floor that would only be operational when it leads in the direction of travel). This latter and the provision of two sludge take up means one at each end of the system that carries them such as a trolley are described in the above mentioned Moore patents and are necessary to ensure complete sludge floor coverage while reducing the trolley travelling distance that reduces proportionately to the distance between the two takeup means. Ensuring that only the leading sludge take up means is operational during desludging is also an economic and efficiency factor.

Automatic change-over with change in direction requires an appropriate change-over valving system. The external system (external to the tank) described above can apply even when there is no drive element, providing there are two telescopic conduits which could then discharge at the same end. Where only a single telescopic conduit is involved, internal change-over valved means between the dual sludge take up means and their connection to the common telescopic conduit is required.

DRAWINGS

FIGS. 1 and 2 (Sheet 1) illustrate in vertical, FIG. 1, and plan section, FIG. 2, the lower section of a settling tank 1, with a dual 'end on' arrangement of the telescopic conduits to illustrate not only the telescopic conduits of the invention, but also the drive aspect whereby there is an exaggerated difference in diameter or cross sectional area between the outer telescopic conduits 2 and 2a and the inner telescopic conduits 3 and 3a in order to provide an area on the sliding seal 9 that is attached to the inner end of the inner telescopic conduits and subject to differential pressure when desludging, generates a force that draws the inner conduits 3 or 3a inwards and incidentally the travelling trolley that carries independent perforated sludge take up conduit 5 connected to inner telescopic conduit 3 and take up conduit 5a connected to inner conduit 3a causing the trolley to reciprocate depending on which desludge conduit is activated. Outer fixed telescopic conduits 2 and 2a thread the end walls of settling tank 1 to discharge via isolating valves 4 and 4a into drain boxes 7 and 7a with purge valves at 8. The trolley runs on wheels 10 that bear on the floor of the vessel 17 and has side guide wheels 6, that operate on the side walls.

Figure 3:
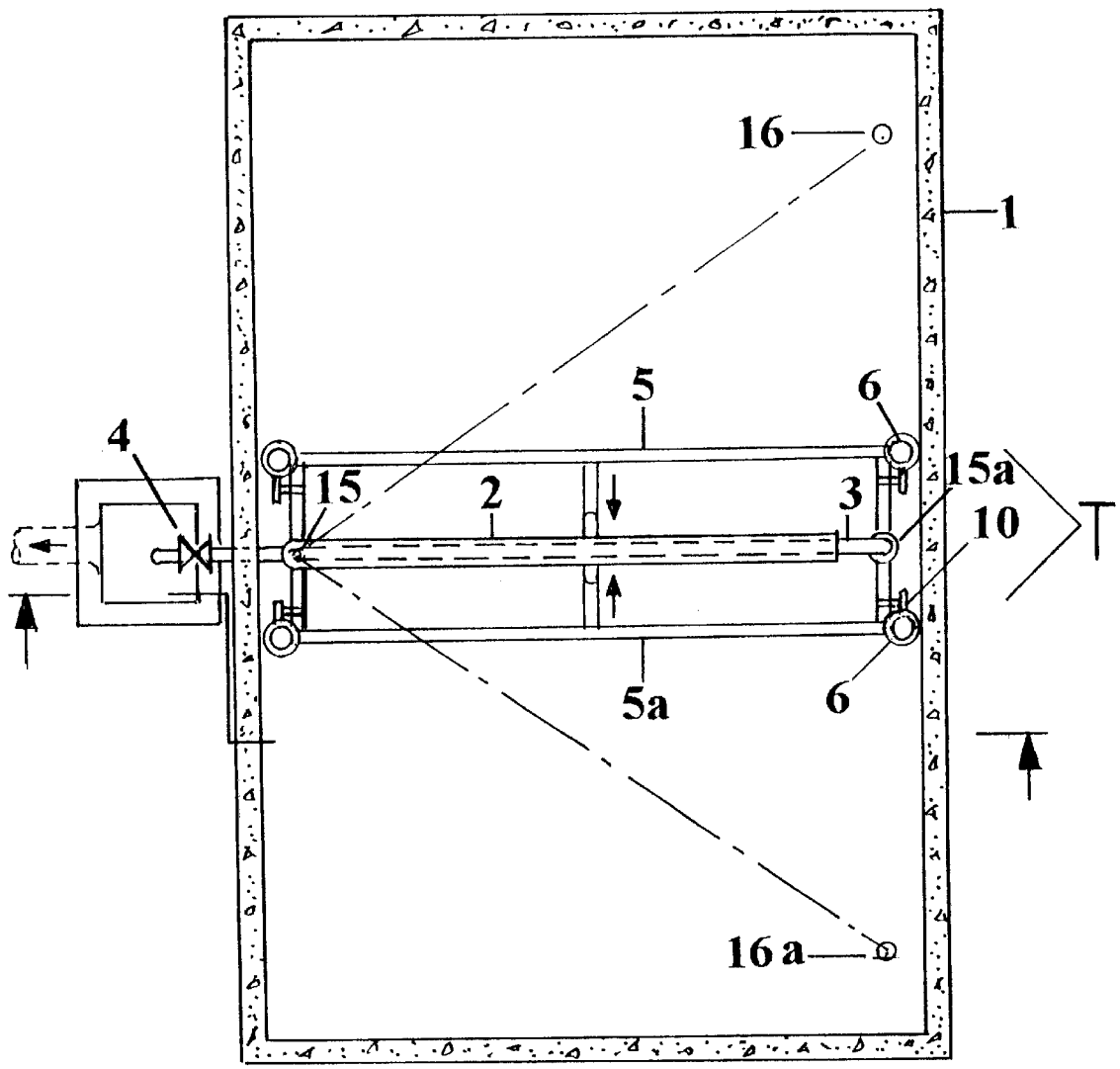

When desludging, valves 4 and 4a are automated to open and close respectively at the end of travel of the trolley to reverse its direction and transfer the desludge flow to the leading desludge take up conduit 5 or 5a FIGS. 3 and 4 (sheet 2) again illustrate the lower section of a settling tank, 1, in plan and vertical cross section respectively, however in this instance the illustrations depict a reciprocating desludge system utilising the second basic (sideways) form of the telescopic conduit of the invention in which one end of the outer sleeve, 2, of the telescopic conduit swivels at 15 about a fixed exit conduit, 14, that threads the side wall of the tank, and in which the inner sleeve, 3, of the telescopic conduit swivels at 15a about the common sludge delivery conduit 11 that travels with the trolley T.

Trolley T with perforated sludge uptake pipes 5 and 5a, reciprocates backwards and forwards across the floor of tank 1 whereby the swivelling connecting point 15a, of the telescopic conduit moves to positions 16 and 16a at the limits of travel with the telescopic conduit expanding accordingly.

Since in this instance there is only a single telescopic conduit conveying sludge from either sludge takeup conduits 5 or 5a a valve change over system at 12, automatically transfers sludge takeup flow to the new leading takeup conduit at the change in direction of the trolley.

Valve 4 on sludge discharge conduit 14 serves to isolate sludge flow or initiate desludging.

The reciprocating trolley T runs on wheels 10 resting on the floor 17 of the settling tank and is guided by wheels 6 or skids bearing on the side walls of the settling tank.

Figure 5:
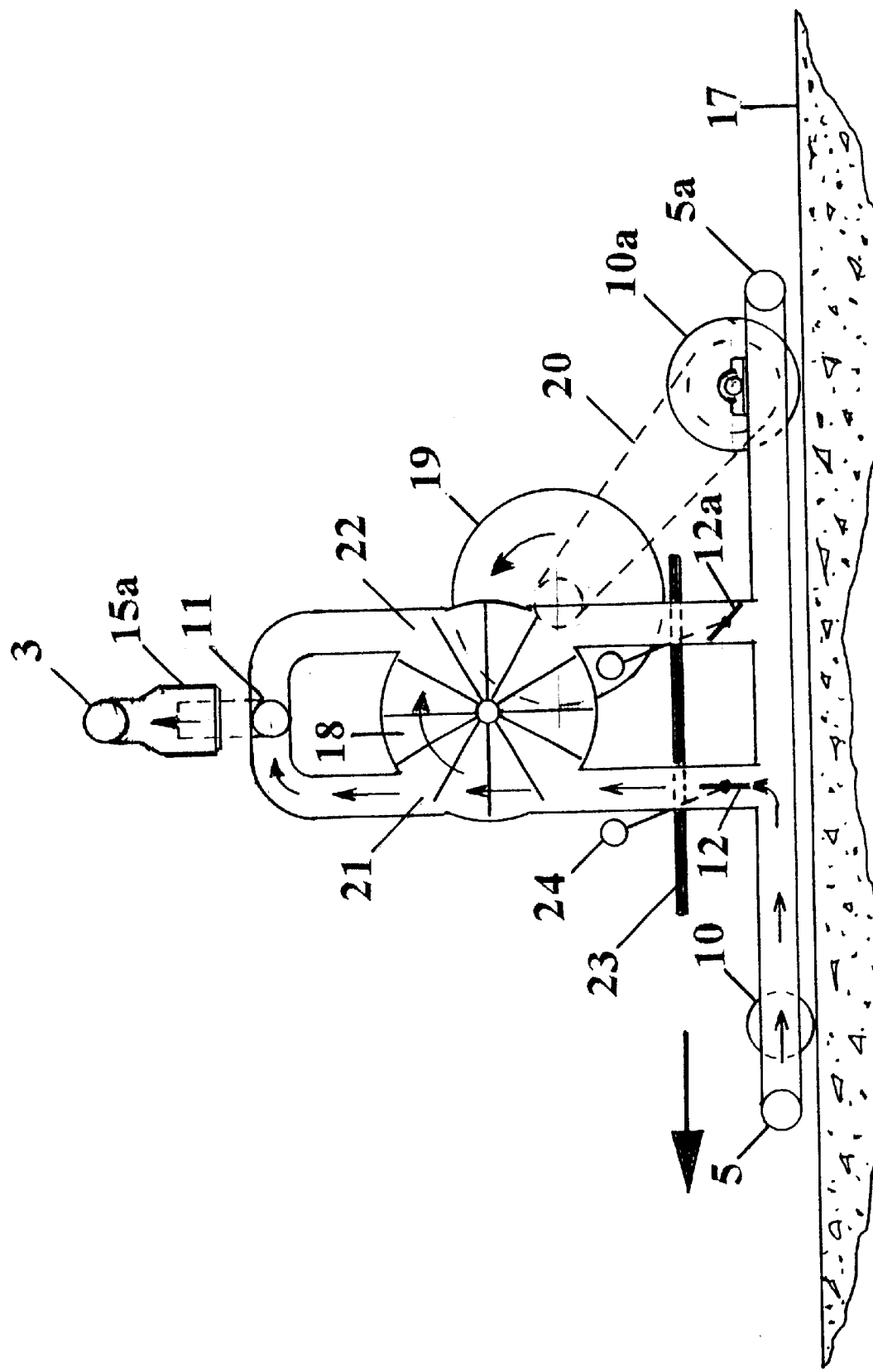

The drive means for the trolley is not illustrated in FIGS. 3 or 4 of sheet 2 but may take several forms including that illustrated in FIG. 5 (sheet 3).

FIG. 5, sheet 3, illustrates a method of driving a reciprocating sludge take up trolley (shown operating on settling tank floor, 17) compatible with the telescopic conduit arrangement illustrated in FIGS. 3 and 4.

According to this aspect of the invention the drive means for the trolley comprises a rotary vane or liquid driven rotor 18, enclosed in a housing with a passage for taken up sludge flow (that impinges on the rotor vanes) on either side of the rotor depending on change over valves 12 and 12a that route the taken up sludge flow to one or the other side and cause the rotor to rotate in one direction or the reverse direction and via friction or gear driven reduction drive unit 19, belt or chain drive 20 and trolley drive wheel 10, cause the trolley to travel in one direction or the reverse direction.

The operating arms of valves 12 and 12a are linked by a common shaft 23, that motivates one valve to close when the other is opened and weights 24 on the valve operating arms to ensure positive open and closed positioning.

Automatic change over of the valves at the end of travel is effected by shaft 23 that travels with the trolley coming into contact with a spring stop at either end of the settling tank, causing the position of valves 12 and 12a to be reversed and consequently the direction of travel of the trolley to be reversed.

In the illustration change over disc valve 12 is shown open with disc valve 12a closed, the sludge flow being from perforated sludge take up conduit 5 via left hand vane rotor passage 21 into common conduit 11 and inner telescopic conduit 3 causing the rotor 18 to rotate in the direction of the arrow and drive the trolley in the direction of the active sludge take up conduit 5.

Motive power for the flow of desludge liquid may be hydrostatic head on its own or assisted by or replaced by pumped suction connected to the desludge outlet.

What is claimed is:

1. A process for conveying desludging fluid in a desludging system comprising an expanding and contracting telescopic conduit in which one or more hollow conduit tubes with in-between sealing means slide within each other and provide the means for conveying desludging fluid from a movable sludge take up point to a fixed stationary receiving point by continuously varying the amount of expansion and contraction as dictated by the position of travelling sludge take up means that reciprocates on the floor of a vessel in which settled material is deposited.

2. The telescopic desludging process of claim 1 in which the desludging fluid flow in conjunction with the hydrostatic head when desludging is utilised to motivate the travelling sludge takeup means.

3. The telescopic desludging drive motivating process of claim 2 in which the motivating means includes separate opposing telescopic conduit systems each serving separate travelling sludge take up means and in each of which an exaggerated difference in cross sectional area between the inner and outer conduit members of the telescopic transfer systems provides, when desludging, a force on the in between sealing means of the telescopic conduit that is utilised to drive the travelling sludge take up means.

4. In a desludge system where settled material on the floor of a sedimenting vessel is taken up by liquid suction means reciprocating above the floor of the vessel and transferred to the exterior of the vessel by flexible conduit means that continuously accommodates the varying horizontal distance, the improvement whereby the means to transfer or convey the liquid taken up by the liquid suction means comprises lengthways expandable and contractible telescopic fluid conduit means having an outer tubular conduit member connected at one end to fixed outer fluid receiving conduit means and threaded from its opposite end by a slideable inner tubular conduit member in turn connected at its opposite end to a movable fluid delivery source or vice versa with slideable sealing means between the inner and the outer tubular conduit members the whole comprising means, in the operation of a desludge system, to convey the taken up fluid from mobile settled material or sludge take up means to stationary fluid conduit receiving means by continuous expansion and contraction of the telescopic means to accommodate the varying distance between the movable sludge take up means and the fixed sludge receiving conduit.

5. In which the telescopic conduit of claim 4 serves to convey taken up liquid from two separate mobile sludge take up means that jointly reciprocate backwards and forwards on the floor on which settled material comes to rest and are provided with automatic change over isolating means between each no that when reciprocating only the leading suction take up member is functional to take up the liquid sludge flow and deliver this to a common telescopic conduit for delivery to stationary conduit means threading the wall of the sedimenting vessel and that has isolating means to initiate fluid flow.

6. In which each of the individual sludge take up members of claim 5 are provided with separate telescopic fluid transfer means with connections delivering to the exterior of the settling tank or vessel from which the sludge in being removed and where automated isolation means for each of the separate sludge take means may be provided exterior to the tank or vessel.

7. The desludging system of claim 6 in which the separate telescopic fluid transfer means are located at opposite ends of the settling tank or vessel, have a larger (cross sectional) outer conduit member in relation to the inner conduit member, are orientated in the line of travel of the reciprocating sludge take up means and additionally motivate the reciprocating sludge take up means via motive power resulting from the differential pressure when desludging active on that area of the sliding seal (that in attached to the inner telescopic member, the opposite end of which is attached to the reciprocating sludge take up means) presented by the difference in size between the outer and the inner telescopic members and the difference in level between the liquid in the settling tank or vessel and the lower level of the discharge ends of the larger desludge conduits.

8. In which the hydrostatic drive head of the hydraulically driven mobile sludge take up means of claim 7 is enhanced by the provision of additional suction means such as a pump connected to the sludge discharge ends.

9. A desludge system as claimed in claim 7 in which the telescopic conduit has swivelling end connections permitting the fixed receiving outgoing conduit to which the delivery end of the telescopic conduit connects, to be located midway on the side wall of a settling tank and the telescopic conduit to change direction as it expands and contracts and follows the reciprocating sludge take up means to which its other and is connected via swivelling means.

10. In a desludging system where sedimented material is removed from the floor on which it has come to rest by reciprocating suction take up means operable on the said floor and comprising two suction take up means carried by common mobile means with automatic change over means so that only the leading sludge take up means in the reciprocating motion is operative, motive drive means for the reciprocating sludge take up means is provided by the desludge fluid flow such that the flow of fluid from the active sludge take up means is caused to pass through one side of a rotary liquid driven motor causing this to rotate in one direction and via belt or other reduction drive means cause the mobile means that carries both sludge take up means to be motivated in the direction of the then active leading sludge take up means and at the change over of the fluid flow to be from the other sludge take up means, cause the fluid flow to pass through the opposite side of the rotary liquid driven motor to reverse it's rotation and consequently the driven direction of travel of the reciprocating sludge take up means, and converting the previously trailing sludge take up means to become the active leading sludge take up means.

11. A desludging system as claimed in claim 10 in which the isolating means to automatically transfer the fluid flow from the leading to what was the trailing sludge take up means comprises in each taken up liquid conduit, rotary motivated disc valves operationally linked together by a common shaft so that when one valve is open the other is closed and provided with weighted means tending to maintain the fully open and closed valve positions and opposing change over until an intermediate peak is reached when the change over is then assisted by the weight, the change over being affected by the common operating shaft travelling with the reciprocating suction take up means coming against spring means on reaching the end walls of the settling vessel, the spring means being compressed until the resistance to change of the said weight is overcome.

* * * * *